(12) United States Patent
Shinohara et al.

(10) Patent No.: US 7,483,056 B2
(45) Date of Patent: Jan. 27, 2009

(54) IMAGE CAPTURING APPARATUS WITH BLUR COMPENSATION

(75) Inventors: Junichi Shinohara, Ohta-ku (JP);
Kunihisa Yamaguchi, Ohta-ku (JP);
Naoki Koshida, Ohta-ku (JP);
Keiichiroh Hirahara, Ohta-ku (JP);
Hiroyuki Chiba, Akita (JP)

(73) Assignee: Ricoh Company, Ltd., Tokyo (JP)

( * ) Notice: Subject to any disclaimer, the term of this patent is extended or adjusted under 35 U.S.C. 154(b) by 768 days.

(21) Appl. No.: 10/641,050

(22) Filed: Aug. 15, 2003

(65) Prior Publication Data
US 2004/0100561 A1 May 27, 2004

(30) Foreign Application Priority Data
Aug. 20, 2002 (JP) ............................. 2002-238757

(51) Int. Cl.
*H04N 5/228* (2006.01)
(52) U.S. Cl. ................................. 348/208.7
(58) Field of Classification Search ............ 348/208.99, 348/208.1–208.4, 208.5, 208.7–208.11
See application file for complete search history.

(56) References Cited

U.S. PATENT DOCUMENTS

| | | | |
|---|---|---|---|
| 4,791,441 A | 12/1988 | Nishi et al. | |
| 4,831,399 A | 5/1989 | Tsurukawa et al. | |
| 4,841,325 A * | 6/1989 | Hoshino et al. | ............... 396/75 |
| 4,847,648 A | 7/1989 | Yamaguchi et al. | |
| 4,950,061 A | 8/1990 | Tsurukawa et al. | |
| 5,070,356 A | 12/1991 | Nakamura et al. | |
| 5,146,254 A | 9/1992 | Tsurukawa et al. | |
| 5,150,143 A | 9/1992 | Ohno et al. | |
| 5,192,860 A | 3/1993 | Shinohara et al. | |
| 5,192,964 A | 3/1993 | Shinohara et al. | |
| 5,270,755 A | 12/1993 | Ohno et al. | |
| 5,293,034 A | 3/1994 | Ohno et al. | |
| 5,309,190 A | 5/1994 | Shinohara et al. | |
| 5,682,563 A | 10/1997 | Shinohara et al. | |
| 5,815,742 A * | 9/1998 | Hamada et al. | ............... 396/55 |
| 5,973,319 A * | 10/1999 | Washisu | ................ 250/231.13 |
| 6,085,041 A * | 7/2000 | Shiokama | .................... 396/75 |
| 6,128,035 A * | 10/2000 | Kai et al. | .................. 348/208.2 |
| 6,342,918 B1 * | 1/2002 | Inou et al. | ................. 348/208.1 |
| 6,344,876 B2 * | 2/2002 | Shiomi | .................... 348/208.1 |
| 6,546,200 B2 | 4/2003 | Yamaguchi | |

(Continued)

FOREIGN PATENT DOCUMENTS

JP 2000307937 A * 11/2000

*Primary Examiner*—Justin P Misleh
(74) *Attorney, Agent, or Firm*—Oblon, Spivak, McClelland, Maier & Neustadt, P.C.

(57) ABSTRACT

An image capturing apparatus in which an image of a subject formed by lenses and a low pass filter of a photographic optical system is provided to an imaging device unit that supplies a corresponding signal to an A/D converter that in turn provides an output to an image processing unit. A blur-detecting device with a blur detecting part and a blur detecting unit detect blur that is compensated by a blur compensating unit with a blur-compensation driving unit. A system controller computes a displacement amount for blur compensation by the blur-compensation driving unit driving the blur compensating unit based on an output of the blur detecting device. A memory group is included for calibrating a conversion coefficient used by the system controller in calculating the displacement amount.

10 Claims, 4 Drawing Sheets

U.S. PATENT DOCUMENTS

| | | | |
|---|---|---|---|
| 6,574,436 B2 * | 6/2003 | Otani et al. | 396/52 |
| 6,577,819 B2 | 6/2003 | Yamaguchi | |
| 6,630,951 B1 * | 10/2003 | Suzuki | 348/208.5 |
| 6,686,954 B1 * | 2/2004 | Kitaguchi et al. | 348/208.1 |
| 6,778,210 B1 * | 8/2004 | Sugahara et al. | 348/208.4 |
| 6,781,622 B1 * | 8/2004 | Sato et al. | 348/208.4 |
| 6,930,708 B1 * | 8/2005 | Sato et al. | 348/208.99 |
| 6,940,542 B2 * | 9/2005 | Kitazawa et al. | 348/208.99 |
| 7,057,644 B2 * | 6/2006 | Masuda | 348/208.2 |
| 7,286,164 B2 * | 10/2007 | Shinohara et al. | 348/219.1 |
| 2005/0157180 A1 * | 7/2005 | Takahashi et al. | 348/207.99 |

* cited by examiner

IMAGE CAPTURING APPARATUS WITH BLUR COMPENSATION

BACKGROUND OF THE INVENTION

1. Field of the Invention

The present invention relates to an image capturing apparatus or an image reader with a blur compensating device capable of compensating a blur of an image of a subject in imaging the image of the subject by a photographic optical system.

2. Description of the Prior Art

In an image capturing apparatus such as a digital camera, there is proposed and carried out a blur-compensation in which an amount of a blur of the image capturing apparatus, when a photographer holds the image capturing apparatus relative to a subject, is detected by a blur detecting device, an imaged plane or an image of the subject on the imaged plane is displaced by a blur compensating device in response to the detected blur condition, and then an exposure is executed by minimizing a relative displacement of the subject image and imaged plane.

In the conventional blur-compensation, whether or not such blur-compensation is proper depends on how minimizing an amount of displacing a compensating system to compensate the detected blur amount, a difference between the displaced amount and an appropriate value or reference value, namely, an error of the amount of the blur-compensation.

Conventionally, there is known a feed back control to provide an appropriate amount of movement of the compensating system, in which the displaced amount by a driving of the compensating system is detected and adapted to feed back in order to control an operation of the blur-compensation.

However, even though the feed back control is carried out, if a temperature characteristic, a change with time or the like of a detecting system in the blur detecting device, a driving device in the blur compensating system or the like, is considered, it is not possible to eliminate the error of the blur-compensation owing to a change of temperature or the change with time of the detecting system.

SUMMARY OF THE INVENTION

It is, therefore, an object of the present invention to provide an image capturing apparatus with a blur compensating device, which is capable of carrying out a good blur-compensation To accomplish the aforementioned object, an image capturing apparatus with a blur compensating device according to the present invention comprises:

an apparatus body on which an imaging device for imaging a subject is provided, a photographic optical system for projecting a light-flux from the subject toward the imaging device to form an image of the subject on the imaging device, a blur detecting device for detecting an amount of a blur of the apparatus body, a blur compensating device to compensate the blur by displacing an imaged plane and/or the subject image on the imaged plane, a blur-compensation controlling unit for computing an amount of displacement for a compensation in the blur compensating device based on an output from the blur detecting device and for driving the blur compensating device, a unit for calibrating a conversion coefficient to convert the output of the blur detecting device into the displaced amount, and a unit for executing a calibrating operation to execute a mode for calibrating the conversion coefficient by the calibrating unit for the conversion coefficient.

In one embodiment, the calibrating unit for the conversion coefficient has a memory device for storing the conversion coefficient. The executing unit for the calibrating operation causes the conversion coefficient to reset and to store in the memory device when the mode for calibrating the conversion coefficient is executed.

The image capturing apparatus, further, comprises a unit for judging an execution of the calibrating operation to judge that the mode for calibrating the conversion coefficient should be executed, if a predetermined condition is satisfied.

The image capturing apparatus, further, comprises a temperature detecting device. If a temperature out of a predetermined range is detected by the temperature detecting device, the judging unit for the execution judges that the mode for calibrating the conversion coefficient should be executed.

The image capturing apparatus, further, comprises a unit for counting a blur-compensation operation. When the counting unit counts more than predetermined numbers or times, the judging unit for the execution judges that the mode for calibrating the conversion coefficient should be executed.

In one example, the calibrating unit for the conversion coefficient includes a memory device for storing the conversion coefficient, a unit for generating a provisional conversion coefficient, which generates a plurality of provisional conversion coefficients from the conversion coefficient stored in the memory device and a unit for generating a blur evaluating value which generates an evaluating value corresponding to a blur degree.

The calibrating unit for the conversion coefficient generates a blur evaluating value in each time by the generating unit for the blur evaluating value with respect to a plurality of photographed images obtained by photographs for blur-compensation in plural times by use of the plurality of provisional conversion coefficients generated by the generating unit for the provisional conversion coefficient, and an optimum conversion coefficient is determined by the provisional conversion coefficients and blur evaluating value.

The generating unit for the provisional conversion coefficient generates a plurality of provisional conversion coefficients by use of more than one of information, such as a temperature, a number of the blur-compensation operation and a time of the blur compensating operation.

The calibrating unit for the conversion coefficient has a memory device for storing the conversion coefficient and the photographical optical system has a variable focal length. The memory device stores a plurality of conversion coefficients according to a plurality of focal lengths. The calibrating unit for the conversion coefficient carries out a calibration of the conversion coefficient with respect to one particulate or any focal length and computes a conversion coefficient in the focal length based on one optimum conversion coefficient obtained by the calibrated operation to store the computed conversion coefficient into the memory device.

The calibrating unit for the conversion coefficient has also a second memory device for storing an initiate conversion coefficient or a prior conversion coefficient and a memory device for storing a present conversion coefficient. The present conversion coefficient is replaced by the initiate or prior conversion coefficient.

In one embodiment, the blur compensating device employs a laminated type piezoelectric element as a drive source for driving the blur compensating device.

DETAILED DESCRIPTION OF THE PREFERRED EMBODIMENTS

Some embodiments of the present invention will be explained in detail with reference to the accompanying drawings below.

Figure 1:
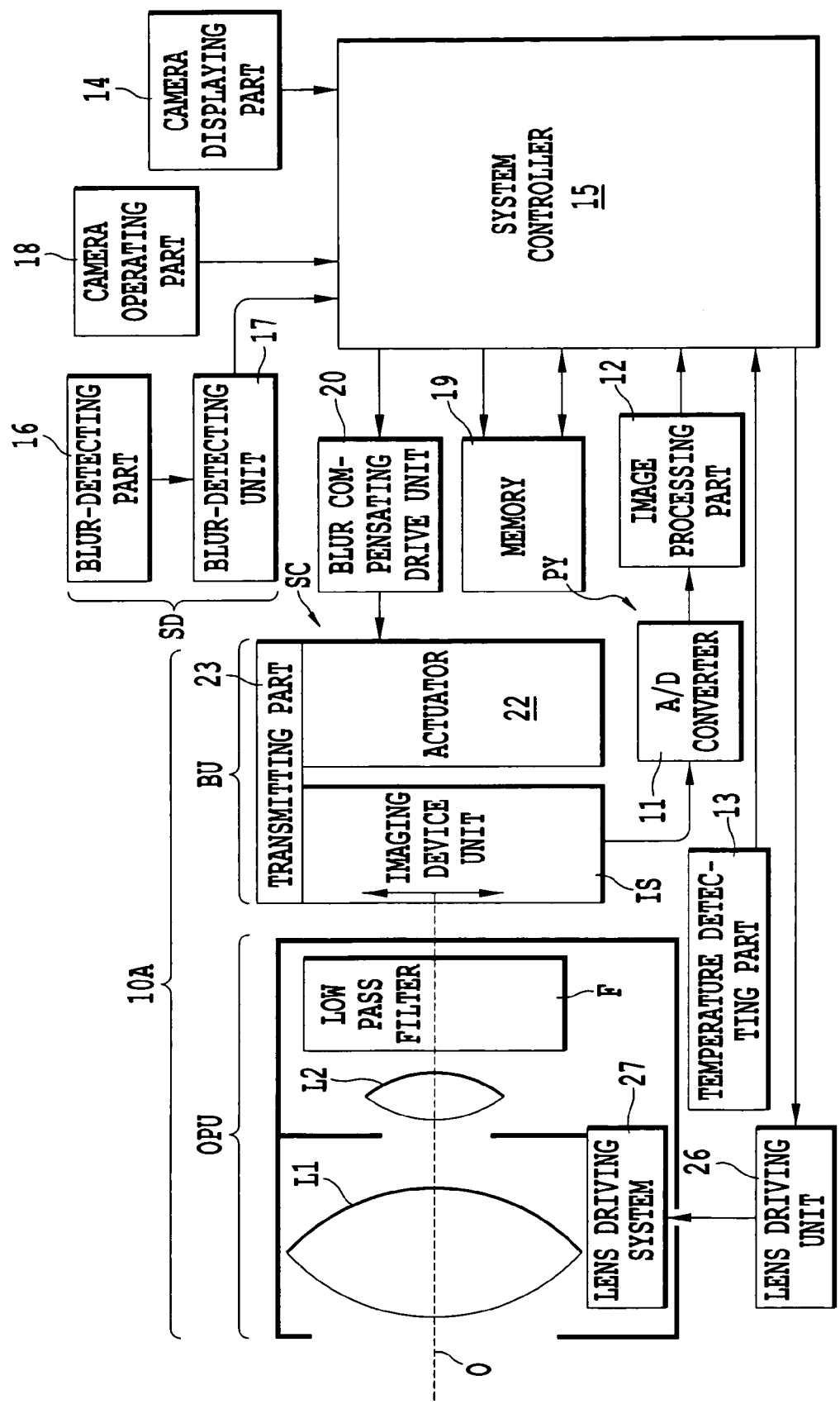
FIG. 1 is a view for explaining a construction of a digital camera showing one example of an image capturing apparatus according to the present invention.
Figure 2:
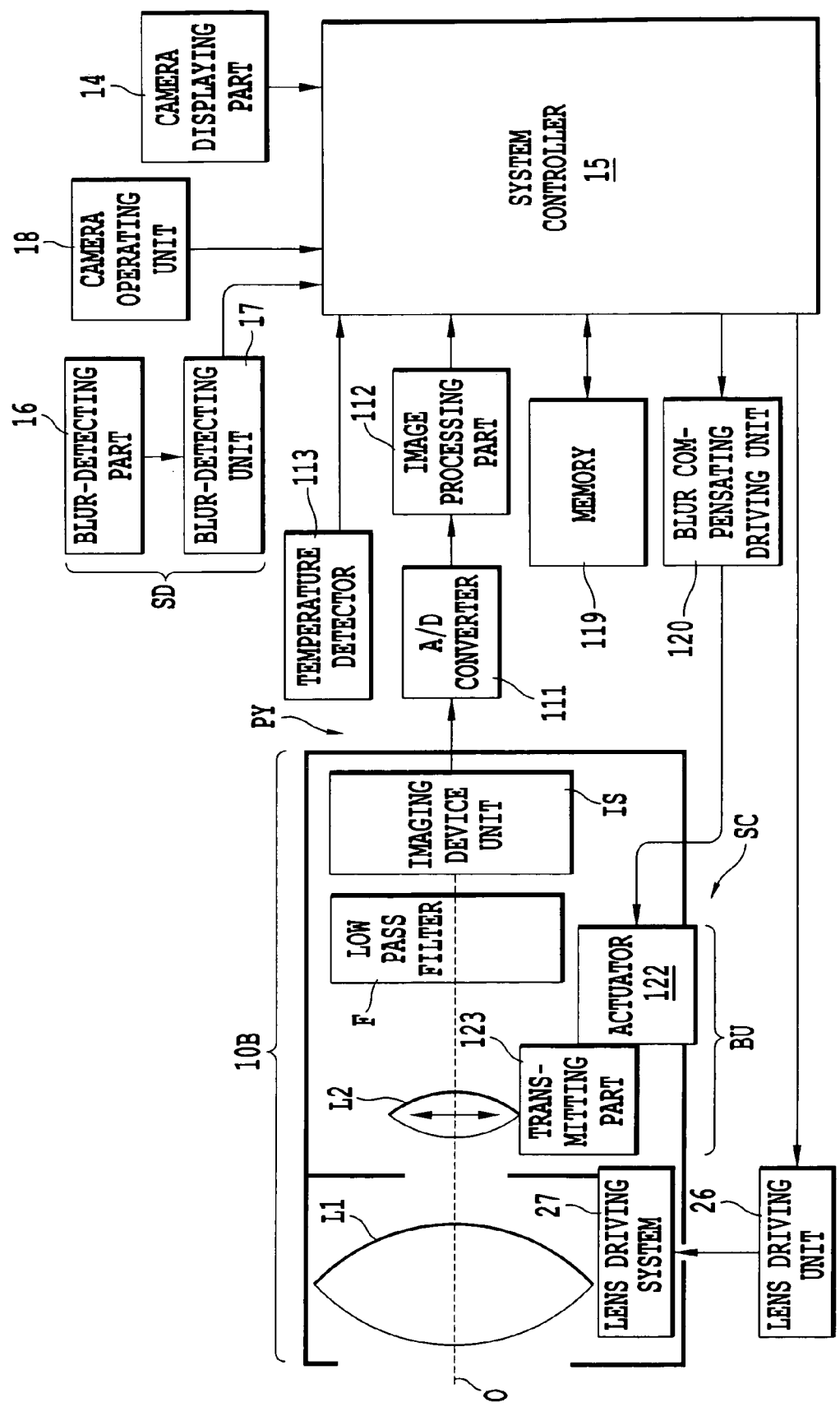
FIG. 2 is a view for explaining the other construction of the digital camera showing the one example of the image capturing apparatus according to the present invention.
Figure 3:
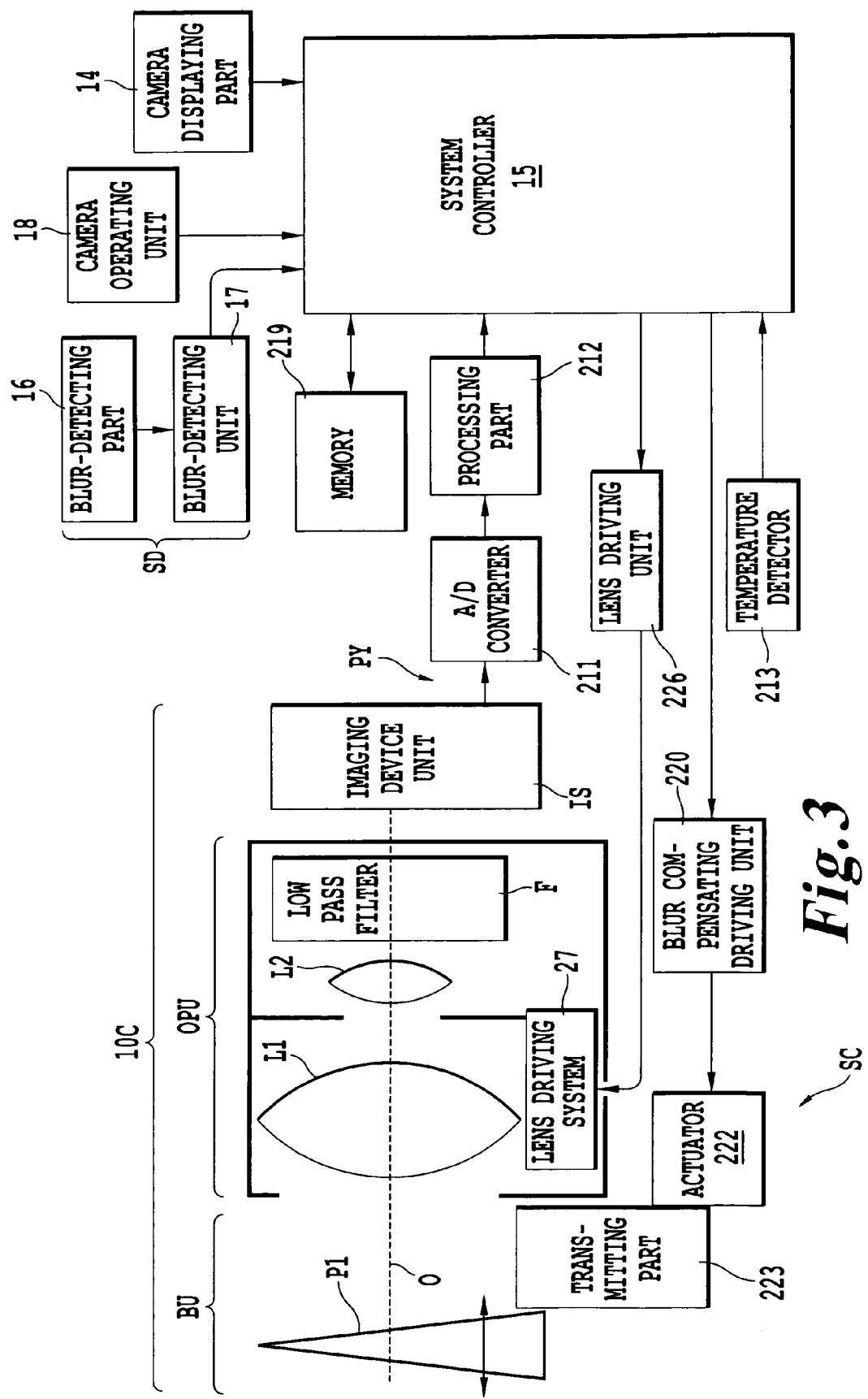
FIG. 3 is a view for explaining the further other construction of the digital camera showing the one example of the image capturing apparatus according to the present invention.

A digital camera or image capturing apparatus with a blur compensating device according to the present invention is shown in FIGS. 1 to 3.

The image capturing apparatus or digital camera shown in FIG. 1 has a configuration of making a blur-compensation by moving an imaged plane in a direction perpendicular to an optical axis of a photographic optical system to displace the imaged plane relative to an image of a subject.

In FIG. 1, the digital camera comprises a lens barrel unit 10A which includes an optical unit OPU as the photographic optical system mounted on a camera body (not shown) as an apparatus body and a compensation unit BU contained in the camera body.

The optical unit OPU has lenses L1 and L2 and a low pass filter F. The compensation unit BU has an imaging device unit IS such as a CCD area sensor or the like, an actuator 22 for compensating and a transmitting part 23.

The lenses L1 and L2 and low pass filter F in the optical unit OPU lead light from a subject to a light-receiving plane which is the imaged plane of the imaging device unit IS and then cause an image of the subject to focus on the light-receiving plane.

An imaging signal outputted from the imaging device unit IS is an electric signal into which the image of the subject is converted. The electric signal is converted into a digital signal by means of an A/D converter 11 and then is inputted through an image processing part 12 into a system controller 15. The imaging device unit IS, A/D converter 11 and image processing part 12 constitute an imaging device.

The digital camera which is the image capturing apparatus has a blur detecting device SD which has a blur-detecting part 16 for detecting a blur of the camera body or apparatus body and a blur-detecting unit 17 for receiving a signal outputted from the blur-detecting part 16 and for outputting a blur-detecting signal.

Further, the digital camera includes a temperature sensor or temperature detecting device 13 disposed within the camera body, a camera displaying part 14 provided on a back surface of the camera body, a camera operating part 18 provided on the camera body and a memory group 19 as a memory device.

The temperature sensor or temperature detecting device 13 detects a temperature within the camera body of the digital camera to output a temperature detecting signal which is inputted into the system controller 15. The camera displaying part 14 includes a liquid crystal display and so on provided on the back surface of the camera body to display a photographical image and give instructions and so on to a photographer. Moreover, the camera operating part 18 has a release switch, mode switch or the like.

The system controller 15 is composed of a micro computer and so on and has a blur-compensation control unit and a calibration-operating executive unit and so on.

In addition, if the micro computer has a blur-compensation control function and a calibration-operating executive function, and a unit or circuit in the micro computer carries out the blur-compensation control function and calibration-operating executive function.

The memory group 19 has a data memory part for storing a kind of data, a program memory part for storing a control program, or program storing part, and an image data memory part or image data storing part for storing image data imaged on the imaging device unit IS. There may be used, for example, a conversion coefficient as the data stored in the data memory part of the memory group 19.

The conversion coefficient is stored in the data memory part of the memory group 19 by means of the system controller 15. The system controller 15 has a unit to generate a plurality of provisional conversion coefficients from the obtained conversion coefficient. In addition, if the micro computer has a function for generating a provisional conversion coefficient, a circuit in the micro computer acts as the unit for generating the provisional conversion coefficient.

The blur compensating device SC includes a blur-compensation unit BU and a blur-compensation drive unit 20. The blur-compensation unit BU includes an actuator 22 for compensating, a transmitting part 23 and the imaging device unit IS. The actuator is composed of, for example, a laminated piezoelectric element. Outputted from the blur-detecting circuit 17 of the blur detecting device SD is a blur-detecting signal as a blur-information, which is inputted into the system controller 15.

When the blur-detecting signal is inputted, the system controller 15 obtains an amount of a blur from the blur-detecting signal by computing it and computes an amount of movement for compensation in the blur compensating device in accordance with the obtained blur-amount and the conversion coefficient stored in the data memory part.

The system controller 15 controls the blur compensating device SC based on the obtained amount of movement as described above. In other words, the system controller 15 inputs an information with respect to the obtained amount of movement into the blur-compensation driving unit 20 of the blur compensating device and controls the blur-compensation driving unit 20 to drive the actuator 22 through the blur-compensation driving unit 20.

The actuator 22 causes the imaging device unit IS to displace through the transmitting part 23 in a direction (for example, up-and-down direction as viewed in FIG. 1) perpendicular to an optical axis O of the imaging optical system.

In this way, a position of the imaged plane is displaced relative to the camera body in accordance with the displacement of the subject's image to eliminate and stop a relative displacement of the subject image and imaged plane.

The system controller 15 causes the lens L1 to displace through a lens driving system 27 by the lens barrel driving unit 26 along the optical axis to carry out zooming, focusing or the like.

The image capturing apparatus or digital camera shown in FIG. 2 has a type in which the blur-compensation can be accomplished by shifting one or more lenses in the photographic lens system in the direction perpendicular to the optical axis and by displacing the subject image on the imaged plane. In FIG. 2, operations of the parts to which the same numerals as that in FIG. 1 are attached are the similar as that in FIG. 1.

In FIG. 2, the image capturing apparatus or digital camera has also a lens barrel unit 10B mounted on the camera body. The lens barrel unit 10B is composed of the lenses L1 and L2, low pass filter F and imaging device unit IS. Light from the subject is directed through the lenses L1 and L2 to the imaging device unit IS and then is imaged as the subject image through the low pass filter F on the light-receiving plane of the imaging device unit IS.

As described above, the image signal outputted from the imaging device unit IS is converted into the digital signal by means of an A/D converter 111 and then is inputted through an image processing part 112 into the system controller 15.

The image capturing apparatus or digital camera has also the same blur detecting device and blur compensating device, as that in FIG. 1.

The blur detecting device SD has the blur-detecting part 16 for detecting a blur of the camera body or apparatus body and the blur-detecting unit 17 for receiving a signal outputted from the blur-detecting part 16 and for outputting a blur-detecting signal.

The blur-detecting signal output from the blur-detecting circuit 17 of the blur detecting device SD is inputted into the system controller 15.

When the blur-detecting signal is inputted, the system controller 15 computes an amount of movement for compensation in the blur compensating device SC and obtains the computed amount.

The blur compensating device SC has a blur-compensation unit BU and a blur-compensation driving unit 120. The blur-compensation unit BU includes an actuator 122 for compensating, a transmitting part 123 and the lens L2.

The system controller 15 drives the blur compensating device SC based on the obtained amount of movement as described above. In other words, the system controller 15 outputs an information with respect to the obtained amount of movement and inputs it into a blur-compensation driving unit 120 of the blur compensating device and controls the blur-compensation driving unit 120 based on the information to drive the actuator 122 through the blur-compensation driving unit 120, thus displacing the L2 through the transmitting part 123 in the direction perpendicular to the optical axis.

As a result, the displacement of the subject image relative to the imaged plane is eliminated and stopped.

The system controller 15 causes the lens L1 to displace by the lens driving system 27 by the lens barrel driving unit 26 along the optical axis to carry out zooming, focusing or the like.

An image capturing apparatus or digital camera as shown in FIG. 3 has a type in which a subject image on an imaged plane is displaced to carry out the blur-compensation by moving an apex angle of an apex angle-variable prism P1 disposed in an optical path for focusing a subject in a direction parallel to the optical axis. In FIG. 3, the same numerals are attached to the same parts as that in FIGS. 1 and 2.

In FIG. 3, the apex angle-variable prism P1 is disposed in a front side of the lens L1 as an object lens.

The image capturing apparatus or digital camera has also the same blur-compensation unit BU and blur compensating device, as that in FIGS. 1 and 2.

The blur-compensation unit BU is composed of an actuator 222 for compensating, a transmitting part 223 driven by the actuator, and the apex angle-variable prism P1 in conjunction with the transmitting part 223. Further, the blur-compensation is composed of the blur-compensation unit BU and a blur-compensation driving unit 220.

The system controller 15 operates the actuator 222 in accordance with the blur amount by means of the blur-compensation driving unit 220 and displaces the apex angle of the apex angle-variable prism P1 in the direction parallel to the optical axis O.

In accordance with the displacement of the apex angle of the prism P1, a relative displacement of the subject image to the imaged plane or light receiving surface of the imaging device unit IS is eliminated or stopped to carry out a blur-compensation with respect to an up-down direction in FIG. 3.

In each of the image capturing apparatuses as shown in FIGS. 1 to 3, if the imaging device unit IS, A/D converter 11, 111 or 211 and image processing part 12, 112 or 212 are replaced by a film and so on, each image capturing apparatus may be used as an analog camera.

Additionally, it is usual to compensate simultaneously both the blurs of up-down and right-left 8 directions of the camera in the blur-compensation.

However, only one system of the blur-detection and blur-compensation is shown in FIGS. 1 to 3 for the simplification of explanation. Actually, the blur-compensation with respect to each of the up-down and right-left directions is carried out through the blur-detection of each of the two systems in the up-down and right-left directions. However, because a structure for the blur-detection and blur-compensation is the same, a structure and an operation of the blur-detection and blur-compensation relating to only the up-down direction of the camera will be explained for the sake of convenience and thus a structure and an operation for the blur-detection and blur-compensation in a lateral direction, namely, right-left direction of the camera are omitted.

In the image capturing apparatus as shown in each of FIGS. 1 to 3, a feed back control is not carried out with respect to the blur-compensation. However, by detection of a position of each of the imaging device unit IS and lens L2, or by detection of a change of the apex angle of the prism P1, such a feed back control can be carried out, in which the aforementioned detected result is feed-backed to the system controller 15.

In the examples as shown in FIGS. 1 to 3, a laminated piezoelectric element is employed as the actuator for compensating. The laminated piezoelectric element is effective to provide a downsized digital camera, since the element is small and has a good responsibility. In this way, by use of the laminated piezoelectric element having the good responsibility, because accuracy for the amount of compensation can be secured, it is not necessary to carry out the feed back control in each of the image capturing apparatuses in FIGS. 1 to 3.

The transmitting part 23, 123 or 223 is interposed between the actuator 22 and the shifted imaging device unit IS in the embodiment in FIG. 1, between the actuator 122 and lens L2 in the embodiment in FIG. 2, and between the actuator 222 and the shifted apex angle-variable prism P1 in the embodiment in FIG. 3. However, the transmitting part is not limited to these arrangements. For example, the imaging device unit in FIG. 1 may be driven directly by the actuator 22, the lens L2 in FIG. 2 may be driven directly by the actuator 122 and the apex angle-variable prism P1 in FIG. 3 may be driven directly by the actuator 222.

Figure 4:
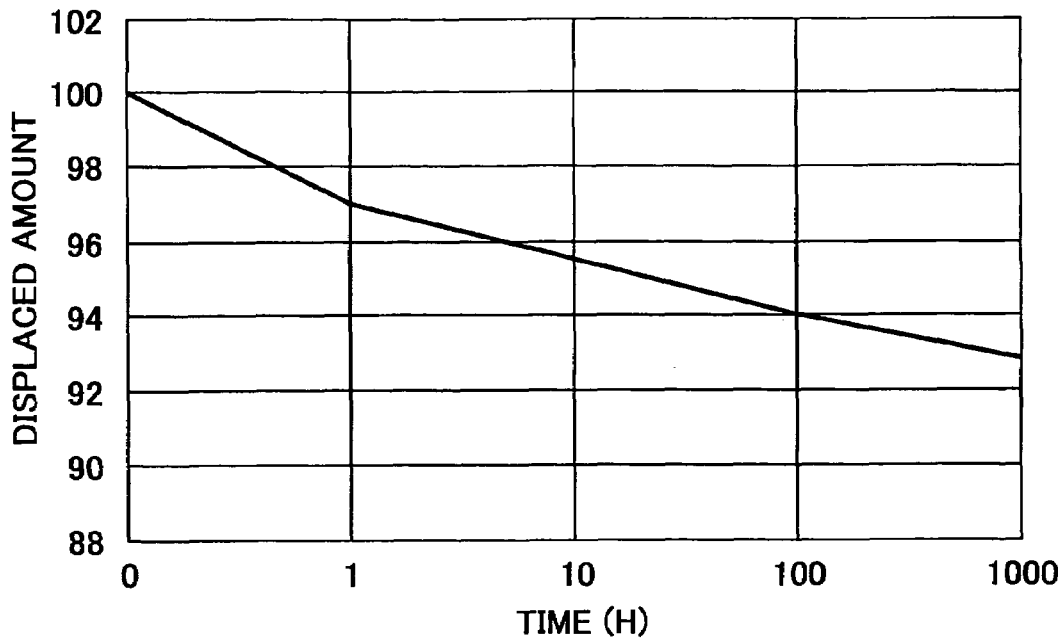
FIG. 4 is a view for explaining one example of a change by time of a displaced amount by a fixed applied voltage in a piezoelectric element as a drive source of a blur compensating device.

FIG. 4 shows a typical example of a change over time on a performance of the laminated piezoelectric element as the actuator. The vertical axis shows an amount of displacement or displaced amount for driving the transmitting part 23, 123 or 223 in case of applying a fixed driving voltage to the laminated piezoelectric element. The horizontal axis shows a cumulated time for applying the driving time (unit: hour) with a logarithm scale. In the displaced amount of the piezoelectric element, a value in the cumulated time 0 (zero) is standardized as 100.

As seen from FIG. 4, the displaced amount tends to decrease in accordance with the increment of the cumulated time. Consequently, it is preferable to carry out a minimum operation of the blur-compensation, namely, to carry out the blur-compensation only when photographing in order to minimize an attenuation of the displaced amount owing to the time lapse.

However, even though the blur-compensation is carried out only when photographing, it is necessary to carry out the blur-compensation in order of 0.5 second per one shot or photograph at once in view of having time on a photographer's side in before and after photographing or time required to stabilize the compensation system. Accordingly, the cumulated time for the application of the voltage reaches to one hour in about 7000 shots of times operating the blur-compensation.

As read out from FIG. 4, even though the cumulated time is one hour, a displaced amount in a degree of about 3% is insufficient. As a result, actually, it is requested to confirm an effect of the blur-compensation even in a step of preparing a photograph or a first release state, or a step of seeking a construct or a monitoring state in ON of a power source. From the request, it is desirable to confirm at which time the blur-compensation is started through a mode and so on.

This is for the reason that if the displaced amount is insufficient by the degree of 3%, a substantial time for carrying out the blur-compensation in the insufficient amount is longer than that in case of a sufficient amount of displacement.

As the example in FIG. 4, as the displaced amount of the laminated piezoelectric element with respect to the fixed driving voltage is decreased with time, an error of the aforementioned amount for the blur-compensation increases in accordance with a lapse of time. The time-lapse increment for the error in the amount of blur-compensation can be avoided somewhat by aging before a delivery from a factory because a proportion of changing the displaced amount becomes small in accordance with the cumulated time of applying the driving voltage. However, it is difficult to neglect completely the time-lapse increment of the error for the amount of blur-compensation and it is not advisable to avoid the time-lapse increment before the delivery from the factory because a time for producing a camera is increased.

A change by temperature or a temperature characteristic with respect to the change for the displaced amount in the laminated piezoelectric element cannot be neglected without limited to the time-lapse change. The temperature characteristic of the laminated piezoelectric element is usually a few %.

However, if there is a temperature change by a friction or the like in a driving mechanism of the compensating device, it is considered that the degree of 10% before and after of the displaced amount of the laminated piezoelectric element is changed in a heat-resistant state according to the temperature change thereof. If an angular velocity sensor is used for the blur-detecting system, an assured value for a temperature characteristic of the angular velocity sensor becomes 10% before and after which is not also neglected.

The temperature characteristic of each of the laminated piezoelectric element and angular velocity sensor may be compensated, if there is no difference in the camera itself, by mounting a temperature sensor in the camera. However, the difference in the camera itself is actually not neglected and therefore it is not possible to accomplish a sufficient compensation in a uniform temperature compensation.

As described above, although the aforementioned embodiments in which the laminated piezoelectric element is a power source and the blur-detection is carried out by the angular velocity sensor have been explained, the present invention is not limited to these embodiments. Because a various of driving methods or detecting methods other than the laminated piezoelectric element or angular velocity sensor have a time-lapse change or temperature characteristic, the present invention is applicable to the driving methods or detecting methods.

At the time of 0 (zero) of the cumulated time for applying a driving voltage, if the driving voltage for applying to the laminated piezoelectric element is Y in order to obtain an amount of displacement necessary to compensate a predetermined amount of blur X, a relationship between the X and Y is Y=AX, where, the constant of proportion A is a conversion coefficient.

Generally, the conversion coefficient is not necessarily limited to the constant of proportion between the output from the detecting system and the input into the driving system for compensation. A various of coefficients which are used in the case of computing the input of the driving system for the compensation from the output of the detecting system collectively, mean the conversion coefficient.

The conversion coefficient is not necessarily one. If the photographic optical system has a variable focal length or a zoom lens, it is necessary to determine conversion coefficients per some zoom positions, because the conversion coefficient is also changed in response to the focal length.

In the present invention, the calibration of the conversion coefficient or coefficients can be carried out in order to compensate the change of the displaced amount of the piezoelectric element 22 for compensating.

In the following description, the piezoelectric element is used as mainly the actuator for compensating, but, the other actuator may be used and a various of conversion coefficients may be used as the conversion coefficient in case of computing the input of the driving system for compensating from the output of the detecting system.

The image capturing apparatus or digital camera in which the image of the subject formed by the lenses L1 and L2, and low pass filter F, in the photographic optical system is inputted by the imaging device unit IS, A/D converter 11, 111 or 211 and image processing unit 12, 112 or 212 in the imaging device comprises the a blur-detecting part 16 and blur-detecting unit 17 in the blur-detecting device SD, the compensating unit BU and blur-compensation driving unit 20, 120 or 220 in the blur compensating device, a blur-compensation controlling device or system controller 15 for computing a displaced amount for compensation in blur compensating device from the output of the blur detecting device and driving the blur compensating device, a device or system controller 15 and memory group 19 for calibrating a conversion coefficient for converting the output of the blur detecting device into the displaced amount, and a device for executing a calibrating operation, or system controller 15 to execute a mode for calibrating by the device for calibrating the conversion coefficient. In the blur compensating device SC, the laminated piezoelectric element 22, 122 or 222 is employed as a power source.

A calibration for the conversion coefficient carried out in the mode for calibrating will be explained below.

In the image capturing apparatus or digital camera, the calibrating unit for the conversion coefficient, which is composed of the system controller 15 and memory group 19, has the memory device or memory group 19 for storing the conversion coefficient. Multiple conversion coefficients are stored in the memory device or memory group 19. The system controller has also the generating unit for generating a plurality of provisional conversion coefficients from the conversion coefficient.

Accordingly, the system controller 15 generates the plurality of conversion coefficients from the conversion coefficient stored in the data memory part of the memory device or memory group 19 in the mode for calibrating the conversion coefficient. At the present time, a message that "please repeat the photograph relative to the same subject in the same conditions" and so on is displayed on the camera display 14.

Every the photograph of carrying out the blur-compensation is repeated relative to the same subject in the same conditions by the photographer, the system controller 15 switches the provisional conversion coefficient through the generating unit. In this way, predetermined numbers of photographs relative to the same subject are carried out under different provisional conversion coefficients. An evaluated value for a degree of blur is generated from photographed image data every each blur-compensation for photograph.

The generation of the evaluated value is accomplished through the system controller 15 having a unit for generating a blur evaluating value. In addition, a various of parameters are considered as the blur evaluating value.

Here, a contrast of the photographed image is employed as blur evaluating value. If the blur is not sufficiently compensated, a blur is generated on the photographed image. The contrast of the photographed image on which the blur is generated becomes low and therefore a degree of the blur-compensation can be evaluated through the contrast of the photographed image.

The system controller 15 has a unit for calibrating a conversion coefficient. The system controller 15 is configured to generate a plurality of provisional conversion coefficients by the generating unit for the provisional conversion coefficient as described above, and to take photographs for the blur-compensation throughout plural numbers by use of the plurality of provisional conversion coefficients, and then to generate a blur evaluating value at each number with respect to a plurality of photographed images obtained by the plural photographs for the blur-compensation, by the generating unit for the blur evaluating value.

Figure 5:
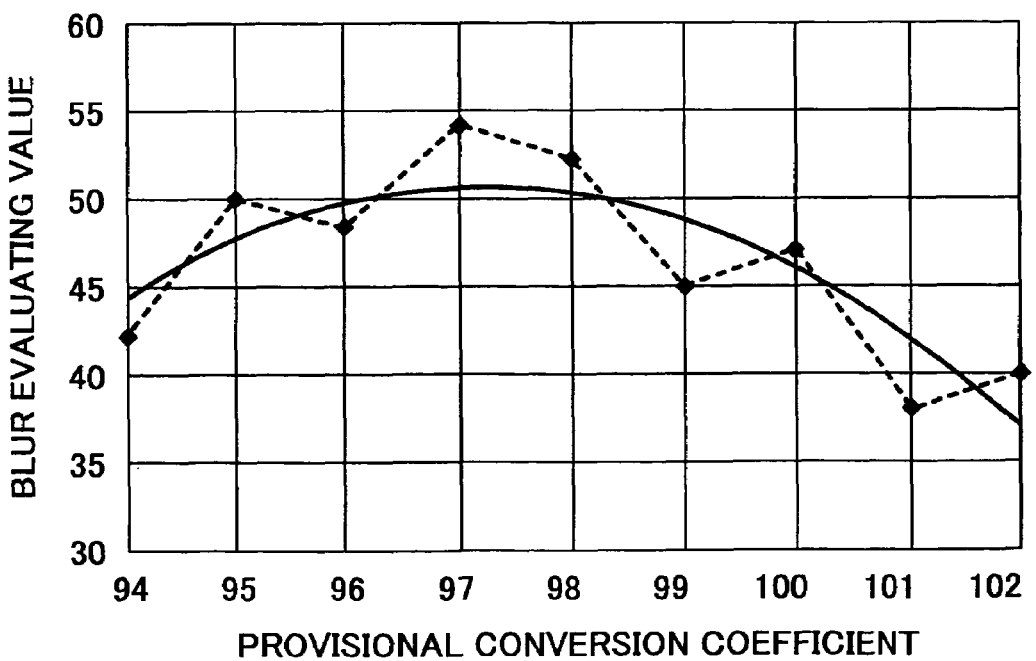
FIG. 5 is a view for explaining a calibration of a conversion coefficient.

FIG. 5 shows a change of blur-evaluating values in dashed line when photographing relative to the same subject by use of nine conversion coefficients from ninety four to one hundred two (94 to 102) as the provisional conversion coefficient.

The blur-evaluating values on the vertical axis show values computed by a computed formula: {(P max−P min)/P max}× 100, based on the contrast of the photographed image (the maximum value of a photoelectric output in all pixels of the photographed image: P max, the minimum value thereof P min).

It is meant that an advantageous effect of the blur-compensation is high when the blur evaluating value is large.

The system controller including the calibrating unit for the conversion coefficient decides an optimum conversion coefficient, based on the provisional conversion coefficients and blur evaluating value.

There are used various methods for deciding the optimum conversion coefficient. For example, in FIG. 5, a blur evaluating value is most high at the conversion coefficient, 97 and therefore the optimum conversion coefficient is decided to "97".

The blur when taking a photograph of the blur-compensation is not necessarily constant, a scattering of the blur evaluating value is generated. Consequently, because it is difficult to judge a peak (conversion coefficient in which the blur evaluating value is optimum) with less data, it is desirable to gain data in the degree of 5 to 10 times.

In order to minimize the scattering of the blur evaluating values or scattering of the blur every each photograph for the blur-compensation, it is preferable that the photograph is taken possibly continuously. It is anticipated that the blur of the image is large when the photographer is tired. Accordingly, without the provisional conversion coefficient being changed in turn, it, for example, changes in random such as 96, 100, 94, 99, 98, 102, 95, 97 and 101, and changes alternately from the center to the opposite sides such as 98, 99, 97, 100, 96, 101, 95, 102 and 94 to minimize the scattering of the blur evaluating values.

In the embodiment, the date of the blur evaluating values based on the nine provisional conversion coefficients are approximated to a curve (full line) of the second order by least squares and the maximal conversion coefficient: 97.4 is decided as the optimum conversion coefficient and then causes the value as a new conversion coefficient to store in the memory device 19.

In other words, when the mode for calibrating the conversion coefficient is carried out, the system controller 15 having the executing unit for the calibrating operation resets the conversion coefficient (97.4 in the aforementioned example) to store it into the memory group 19 or memory device.

In place of the approximation by the curve of second order, the peak may be obtained by addition of operation such as moving average process. In the above, a value most similar to 97.4 (for example, 97) may be decided as the optimum conversion coefficient in the generated provisional conversion coefficients, in place of taking 97.4 as the optimum conversion coefficient, as described above.

Further, during a series of photographs based on the provisional conversion coefficients, commanding a subject, a distance between the subject and a camera, a zoom position and so on from the camera to a photographer is, also, effective to remove a noise of the data.

The command is displayed on the camera display 14. Because the time-lapse change is known as the characteristic in FIG. 4, as a correspondence can be made to such change, the provisional conversion coefficients are stored in the memory device throughout a region of changing the displaced amount.

The provisional coefficients may be the provisional coefficient at the present time and a few points before and after thereof. However, if a direction of changing by the time-lapse or temperature characteristic is known, it is preferable to depend on the direction.

For example, if the operating time for the blur compensation or temperature is known, because it is apparent as to what degree of deterioration is, it is preferable to set a few points before and after the center of a value thereof. In other words, in the system controller 15 having the generating unit for the provisional conversion coefficient, it is preferable to use more one of the temperature characteristic, an information relating to number for operating the blur-compensation and an information of time for operating the blur-compensation at the time of generating the provisional conversion coefficient. In this way, if a function for the blur-compensation is low, an appropriate function for the blur-compensation is reconstructed by carrying out the calibration of the conversion coefficient.

Timing for carrying out the calibrating mode for the conversion coefficient will be explained below.

Carrying out the calibrating mode for the conversion coefficient is to minimize the error for the amount of the blur-compensation. If the error is large, for example, because a blur of a monitoring image is not less, the fact is anticipated to the photographer. Accordingly, when the photographer anticipates that the blur-compensation is not effectively carried out, it is possible to execute the calibrating mode for the conversion coefficient by the photographer.

To accomplish this, there is provided, for example, a command device for executing the calibrating operation such as a button for calibrating the blur-compensation or the like in the image capturing apparatus or digital camera to carry out the calibrating mode for conversion coefficient through an operation of the executing device for the calibrating operation by an operation (by the photographer) of the image capturing apparatus.

In this case, in a manual of a camera, the phrase "if the effect of the blur-compensation becomes low, please execute the calibration of blur-compensation or if the camera is used more 3 years, please execute the calibration of blur-compensation" is written to inform the photographer of a fact capable of carrying out the calibrating mode for the conversion coefficient.

In place of the above, if a predetermined condition is inputted into the image capturing apparatus, this apparatus may be judged about whether or not the mode for calibrating the conversion coefficient is to be carried out, as well as the judging unit for executing the calibrating operation (capable of setting as the function of the system controller 15).

There are also cases that a temperature detecting device (the temperature sensor 13 in the digital camera shown in FIGS. 1 to 3) provided in the image capturing apparatus detects a temperature out of a predetermined range (a used temperature out of a range capable of assuring an effect of the blur-compensation) and a performance of the unit for the blur-compensation is recognized to lack by overworking thereof.

For example, a unit for counting an operation of the blur-compensation (capable of setting as an function of the system controller 15) for adding cumulating an operating time or number in which the blur-compensation is carried is provided in the image capturing apparatus, and it is possible to judge the executing of the mode for calibrating the conversion coefficient, assuming that the predetermined condition is satisfied when more than the predetermined number or time are counted by the counting unit.

A function of the system controller 15 or a circuit within the system controller 15 is employed in the counting unit. The function is not necessarily limited to the circuit. For example, the counting unit may be separated from the system controller 15 to input a counted value from the counting unit into the system controller 15.

In this case, the system controller 15 judges the execution of the calibrating mode for the conversion coefficient under a condition that a predetermined condition is satisfied when more than the predetermined numbers or times of the operations for the blur-compensation are counted.

Counting the number of use of the operation of the blur-compensation is more effective than the cumulated addition of the operated time. However, actually, a close relationship with the lack of the performance for the blur-compensation is the operated time of the blur-compensation and therefore it is possible to obtain a high accuracy by counting the operated time at which the operation of the blur-compensation is turned on. Anyway, the number or operated time is added with cumulus after the delivery from the factory.

As described above, if the image capturing apparatus judges the execution of the calibrating mode for the conversion coefficient, it is also one method that the execution of the calibrating mode is immediately started. However, during photographing by the photographer, if the calibrating mode for the conversion coefficient is executed automatically, the photograph is disturbed and therefore certain condition of the subject must be adjusted to calibrate the conversion coefficient.

Accordingly, if the image capturing apparatus judges the execution of the calibrating mode for the conversion coefficient, it is preferable to instruct the start of execution of the mode by the photographer.

In this case, in order to notice that the calibrating mode should be executed to the photographer, the notification may be displayed on the camera display 14, an alarm may be sounded and a warning lamp may be turned on.

As described above, it is possible to execute further objectively and rationally the calibration of conversion coefficient by causing the necessity of the execution of the calibrating mode to judge by the image capturing apparatus.

By the way, many conventional digital cameras have zoom lenses mounted thereon, and especially, many cameras having blur-compensation circuits include zoom lenses mounted thereon, each of which has a high magnification.

If a focal length of an imaging optical system is variable, an amount of a blur which is detected by an acceleration sensor is the same, but, conversion coefficients in response to each focal length are stored as group of conversion coefficients in the memory group or memory device 19, because each conversion coefficient is different according to the focal length.

At the present time, if the calibration is executed every each focal length in executing the calibrating mode, many times are required. In order to avoid this, a memory device having the calibrating unit for the conversion coefficient is provided so that a plurality of conversion coefficients in response to a plurality of focal lengths are stored in the memory device, the calibration for the conversion coefficients is carried out with respect to a particulate or any one of the focal lengths, and the conversion coefficients in the other focal lengths are stored in the memory device by computerizing them (proportional computerization in response to the magnification of the zoom).

As a result, it is possible to calibrate easily the conversion coefficient in a short time.

Generally, the blur is large when a magnification of a telescopic lens is large, and therefore, without any focal length, if a particulate focal length (telescopic end or a neighborhood thereof is used, a high accuracy of the calibration is obtained. However, any focal length may be used under sacrifice of some accuracy because a zoom operation is executed without the zoom button being pressed by the photographer.

As described above, not only the conversion coefficient changes with time, but also charges in response to a temperature. Generally, the conversion coefficient which changes with time is not reconstructed. However, the change dependent on the temperature is temporary, and therefore if a temperature returns to a region in which a correct blur-compensation can be carried out, the conversion coefficient can be also reconstructed.

Considering such circumstances, it is preferable to return the conversion coefficient calibrated by the calibrating mode to the conversion coefficient before calibrating.

For example, a photograph is carried out in a cold place such as a ski area, with a set of a conversion coefficient by which an effective blur-compensation is obtained even in the vicinity of 0 (zero) degree and C point by the calibrating mode for the conversion coefficient.

If the condition is returned to an ordinary temperature in a room, it is preferable in convenience to set to return to the original conversion coefficient without executing the calibrating mode again.

In this case, although it is considered to return to the initial coefficient at the time of the delivery from the factory, in consideration of the change with time or the like, it is well to return to the conversion coefficient one before or few numbers before in the number that the calibrating mode is executed.

To achieve this, it is preferable that provided on the system controller 15 having the calibrating unit are a memory device for storing the present conversion coefficient (for example, conversion coefficient set by executing the calibrating mode in the ski area) and a second memory device for storing the initial conversion coefficient or the prior conversion coefficient to substitute the present conversion coefficient for the initial or prior conversion coefficient.

As an example of the digital camera shown in each of FIGS. 1 to 3, in the second memory device, a memory area may be provided in the memory group 19 and the substitution of the conversion coefficient can be carried out by the system controller 15 to thus return easily a temporary change of conversion coefficient, such as the temperature change to a normal value.

As explained above, according to the present invention, it is possible to provide a new image capturing apparatus.

In the image capturing apparatus, even though the conversion coefficient in the blur-compensation is changed by the time-lapse or temperature characteristic, the conversion coefficient is calibrated into an appropriate value, and therefore an appropriate blur-compensation is usually provided to obtain a good image input.

Further, because the appropriate blur-compensation is usually executed by the calibration of the conversion coefficient, it is possible not to carry out the feed back control as described in each embodiment. It is effective to produce the image capturing apparatus in compact if the feed back control is not carried out, and the control of the blur-compensation is simplified and therefore an inexpensive image capturing apparatus can be provided.

What is claimed is:

1. An image capturing apparatus comprising:
an apparatus body provided with an imaging device unit including an imaged plane on which an image of a subject is provided;
the imaging device unit including the imaged plane being configured to be capable of being displaced,
a photographic optical system that projects a light-flux from said subject toward said imaging device to form an image of the subject on the imaged plane of said imaging device unit;
a blur detecting device that detects an amount of a blur produced by said apparatus body;
a blur compensating device that compensates for said blur produced by the apparatus body by displacing the imaging device unit including the imaged plane; and
a system controller to control the blur compensating device based on the amount of blur detected by the blur detecting device,
wherein the system controller includes a blur compensation controlling unit that computes an amount of displacement with which the blur compensating device drives the imaging device unit including the imaged plane and is configured to control displacement of the imaging device unit including the imaged plane by the blur compensating device based on the computed amount of the displacement,
wherein the system controller includes a calibrating unit which calibrates a conversion coefficient which is used to convert an output of the blur detecting device into the amount of displacement, and an executing unit that executes a calibrating operation to execute a calibration mode for calibrating the conversion coefficient.

2. The image capturing apparatus according to claim 1, wherein said calibrating unit for the conversion coefficient has a memory device that stores the conversion coefficient, and said executing unit for the calibrating operation causes the conversion coefficient to reset and to store in the memory device when a mode for calibrating the conversion coefficient is executed.

3. The image capturing apparatus according to claim 1, wherein the image capturing apparatus further comprises a unit for judging an execution of the calibrating operation which judges that the mode for calibrating the conversion coefficient should be executed, if a predetermined condition is satisfied.

4. The image capturing apparatus according to claim 3, wherein the image capturing apparatus further comprises a temperature detecting device, and if a temperature out of a predetermined range is detected by the temperature detecting device, said judging unit for execution judges that the mode for calibrating the conversion coefficient should be executed.

5. The image capturing apparatus according to claim 3, wherein the image capturing apparatus further comprises a unit for counting a blur-compensation operation, and when more than a predetermined number or a predetermined operating time is counted by the counting unit, said judging unit judges that the mode for calibrating the conversion coefficient should be executed.

6. The image capturing apparatus according to claim 1, wherein said calibrating unit for the conversion coefficient includes a memory device for storing the conversion coefficient, a unit for generating a provisional conversion coefficient which generates a plurality of provisional conversion coefficients from the conversion coefficient stored in the memory device and a unit for generating a blur evaluating value which generates an evaluating value corresponding to a blur degree, and wherein
said calibrating unit for the conversion coefficient generates a blur evaluating value in each time by said unit for generating the blur evaluating value with respect to a plurality of photographed images obtained by photographs of blur-compensation in plural times by use of the plurality of provisional conversion coefficients generated by the generating unit for the provisional conversion coefficient, and an optimum conversion coefficient is determined based on the provisional conversion coefficients and blur evaluating value.

7. The image capturing apparatus according to claim 6, wherein said generating unit for the provisional conversion coefficient generates a plurality of provisional conversion coefficients by use of more than one of some information such as a temperature, a blur-compensation operating number and a blur-compensation operating time.

8. The image capturing apparatus according to claim 1, wherein said calibrating unit for the conversion coefficient has a memory device for storing the conversion coefficient, said photographic optical system has a variable focal length, said memory device stores a plurality of conversion coefficients according to a plurality of focal lengths, and said calibrating unit for the conversion coefficient carries out a calibration of the conversion coefficient with respect to one particulate or any focal length and computes a conversion coefficient in the focal length based on one optimum conversion coefficient obtained by the calibrated operation to store the computed conversion coefficient into the memory device.

9. The image capturing apparatus according to claim 1, wherein said calibrating unit for the conversion coefficient has a memory device for storing an initiate conversion coefficient or a prior conversion coefficient and a memory device for storing a present conversion coefficient, the present conversion coefficient is replaced by the initiate or prior conversion coefficient.

10. The image capturing apparatus according to claim 1, wherein said blur compensating device employs a laminated type piezoelectric element as a drive source.

* * * * *